US006050235A

United States Patent [19]

Zakharov et al.

[11] Patent Number: 6,050,235

[45] Date of Patent: Apr. 18, 2000

[54] CYLINDER-PISTON ASSEMBLY

[76] Inventors: Evgeny Nikolaevich Zakharov, kv. 127, d.15, korp. 3, ul. Starobitsevskaya, Moscow, 113628; Genya Tyo, kv.4,d.14, per. Ogorodnaya Sloboda, Moscow, 101000, both of Russian Federation

[21] Appl. No.: 09/202,288

[22] PCT Filed: Jun. 11, 1997

[86] PCT No.: PCT/RU97/00187

§ 371 Date: Dec. 11, 1998

§ 102(e) Date: Dec. 11, 1998

[87] PCT Pub. No.: WO97/47870

PCT Pub. Date: Dec. 18, 1997

[30] Foreign Application Priority Data

Jun. 11, 1996 [RU] Russian Federation ............. 96111650

[51] Int. Cl.[7] ................................ F01B 31/00; F16J 1/14

[52] U.S. Cl. .................................... 123/193.4; 123/193.6; 92/193

[58] Field of Search ............................. 123/193.6, 193.4; 92/193

[56] References Cited

U.S. PATENT DOCUMENTS

| | | | |
|---|---|---|---|
| 1,366,415 | 1/1921 | Pearson | 92/193 |
| 1,798,222 | 3/1931 | Reiland et al. | 92/193 |
| 1,855,554 | 4/1932 | La Brie | 92/193 |
| 2,208,782 | 7/1940 | Workman | 92/193 |
| 3,656,414 | 4/1972 | Muller | 92/193 |

FOREIGN PATENT DOCUMENTS

| | | |
|---|---|---|
| 2059854 C1 | 5/1996 | Russian Federation . |
| 2060400 C1 | 5/1996 | Russian Federation . |
| 1698470 A1 | 12/1994 | U.S.S.R. . |

*Primary Examiner*—Marguerite McMahon
*Attorney, Agent, or Firm*—Graybeal Jackson Haley LLP

[57] ABSTRACT

The present invention pertains to mechanical engineering, and more particularly to cylinder and piston assemblies mainly intended for use in two-stroke internal combustion engines. The cylindrical surface of the piston (5) is provided with recesses (9) located between sealing rings (6) and containing spring-biased elongate members (8). These members provide elongate sealing and define together with seal rings (6) an enclosed sealed area on the surface of the cylinder (1) in the region of the gas distributor ports (2,3). The system described in the present invention may be used to prevent leakage of the last charge and the combustion products from a first port of the gas distributor to the second port through the gap around the piston (5).

7 Claims, 3 Drawing Sheets

CYLINDER-PISTON ASSEMBLY

FIELD OF THE INVENTION

The present invention relates to mechanical engineering, particularly, to engine designs, and, more particularly, to sealing a cylinder and piston assembly for internal combustion engines.

BACKGROUND OF THE INVENTION

In a conventional cylinder and piston assembly, for example, for two-stroke engines with slot gas distribution, sealing is accomplished by resilient split rings (see Krouglov M. G., Combined Two-Stroke Engines, Moscow, Mashinostroenie, 1977, p.8).

The prior art, however, provides sealing only the annular gap caused by the presence of expansion clearance between a piston and a cylinder wall. With the slot gas distribution which is commonly used in the majority of two-stroke engines, the efficiency of such sealing is inferior as both the combustion products and the pre-compressed charge can flow between blowoff and exhaust ports through the annular gap around the piston, in particular, where the rings meet gas distribution ports. As in two-stroke engines the expansion clearance is relatively large, and increasing the cylinder diameter drastically contributes to the gap area to piston area ratio, the resulting enhanced loss of the fresh charge and increased residual gas ratio prohibit the attainment of high volumetric performance in the two-stroke engines having the cylinder of a diameter above 100 mm and the gas distribution ports arranged in the same lateral plane of the cylinder.

U.S. Pat. No. 2,208,782 discloses a cylinder and piston assembly for an internal combustion engine, comprising a cylinder with gas distribution ports separated by walls, a piston arranged in the cylinder and provided with at least a pair of sealing rings located in grooves and at least a pair of spring pressed elongate members located in the respective grooves on the piston cylindrical surface.

A disadvantage of the above prior art, most closely approaching the present invention, is that the elongate members do not lend themselves to sealing functions as they fail to mate the sealing rings.

SUMMARY OF THE INVENTION

It is an object of the present invention to improve the performance of engines with the slot gas distribution.

The above object is attained by arranging spring pressed elongate members between sealing rings so as to define an enclosed sealed area on the piston cylindrical surface, the spring pressed elongate members being disposed adjacent to the cylinder walls in contact with them.

The object of the present invention is also attained by making a distance between edges of the sealing rings, external to the elongate members, greater than a minimum height of the gas distribution ports.

The object of the present invention is further attained by making recesses for elongate members of a length exceeding a distance between the grooves, the elongate members being arranged so that their ends contact end faces of the sealing rings.

At the ends, the elongate members can have shanks disposed between the piston surface and the sealing rings and contacting inner annular surfaces of the latter.

A length of the elongate members can exceed a distance between the sealing rings, at least one end of the elongate member being located in a split in the sealing ring between its face ends.

A cylinder and piston assembly can be provided with at least one additional ring, the elongate members having lateral grooves, and the additional ring being located between the sealing rings in the piston groove and lateral grooves in the elongate members.

Furthermore, the elongate members can be spring pressed by band expanders arranged along the elongate members.

BRIEF DESCRIPTION OF THE DRAWINGS

These and other features and advantages of the present invention will be more clearly understood from the following detailed description of its embodiments taken in conjunction with accompanying drawings in which.

DESCRIPTION OF THE PREFERRED EMBODIMENT

Figure 1:
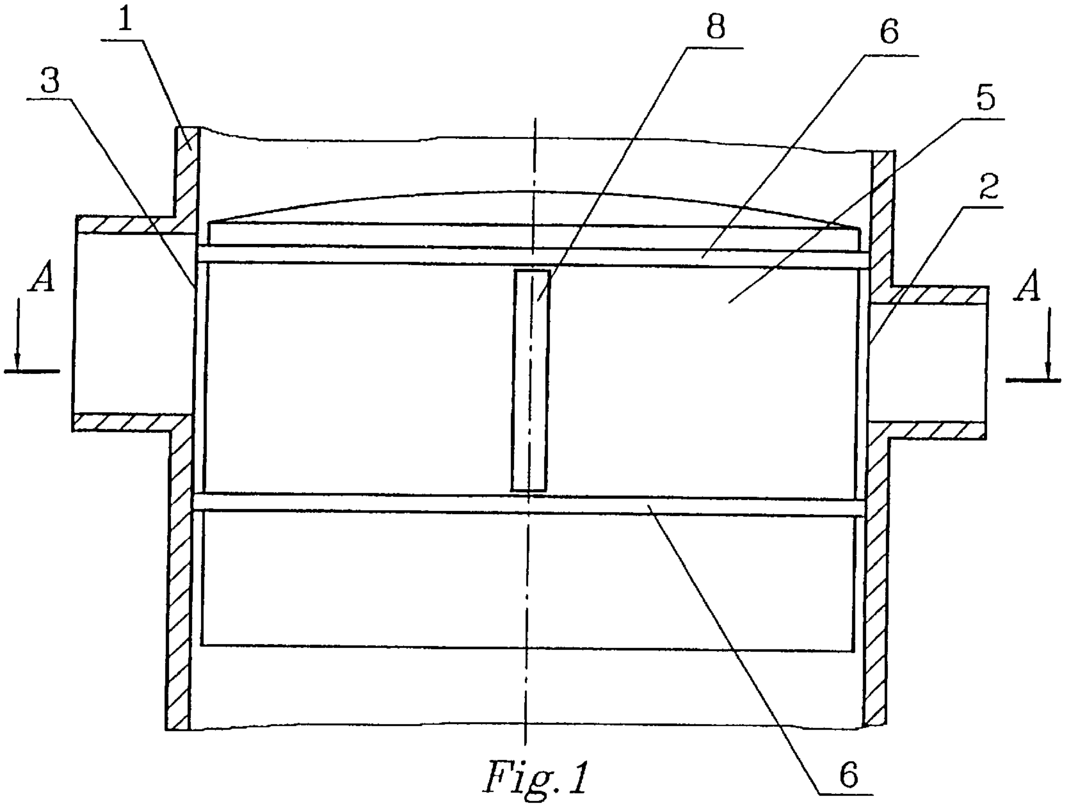
FIG. 1 illustrates a cylinder and piston assembly in accordance with the present invention.
Figure 2:
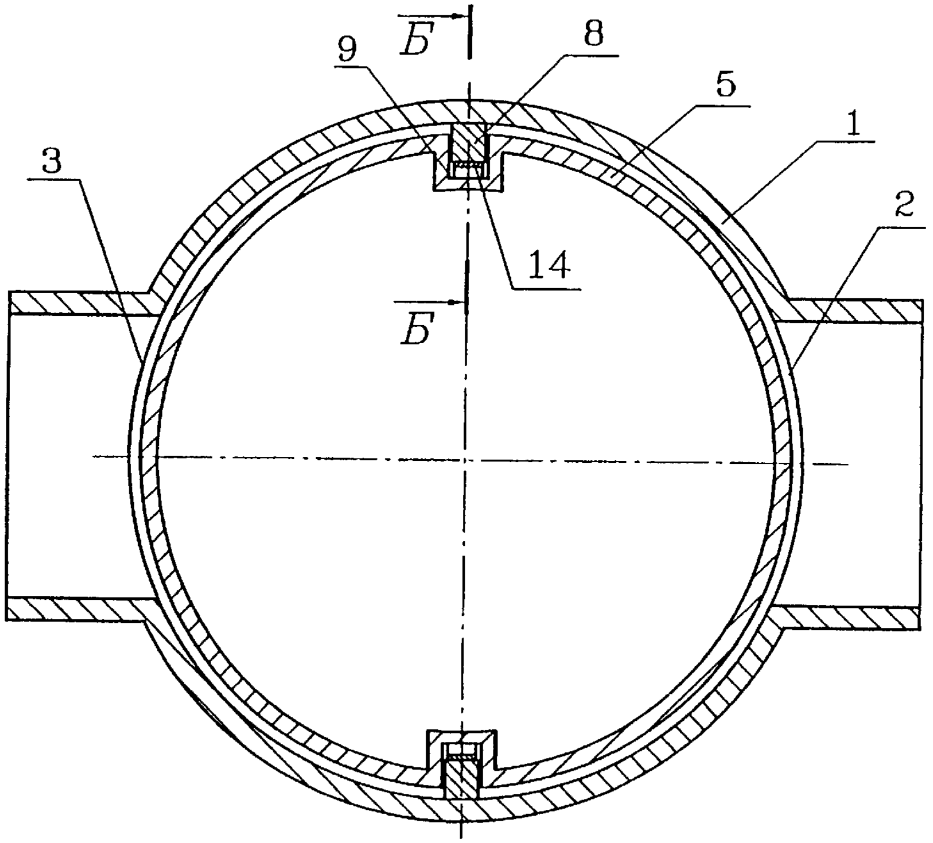
FIG. 2 is a sectional view taken through line A—A of FIG. 1.
Figure 3:
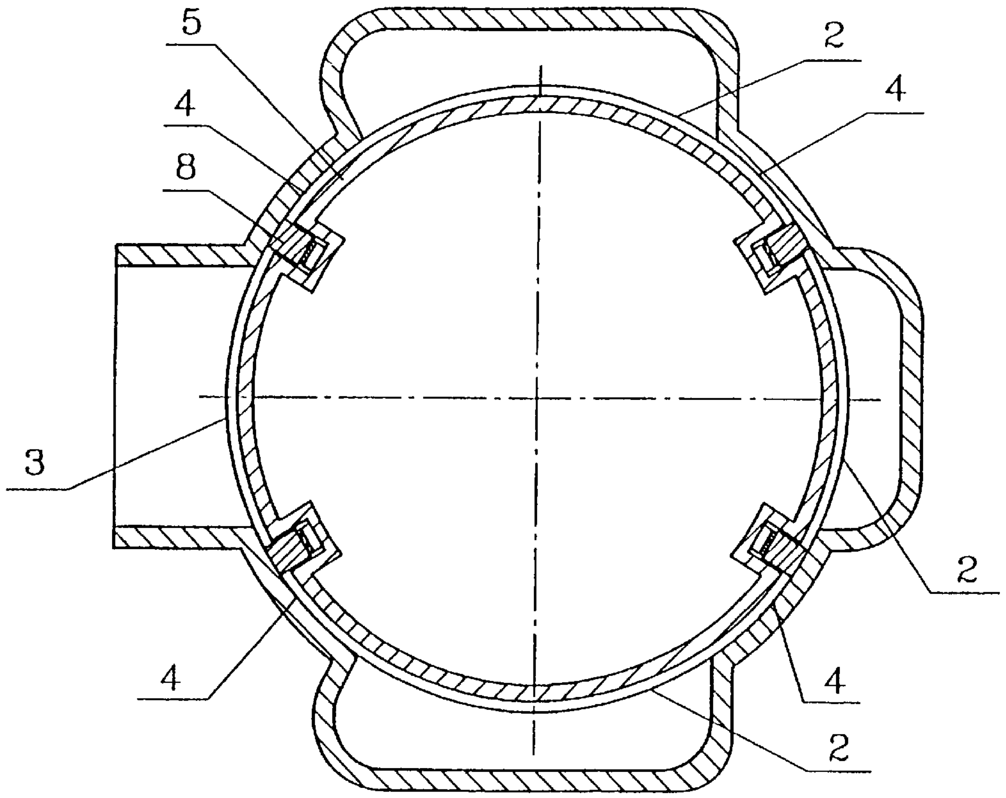
FIG. 3 is a similar view illustrating the arrangement of elongate members.

Referring now to the drawings in detail, a cylinder and piston assembly in accordance with the invention comprises a cylinder 1 having gas distribution ports: a blowoff port 2 and a discharge port 3, the ports being separated by walls 4 of the cylinder 1, a piston 5 provided with a pair of sealing rings 6 located in annular grooves 7 and with spring pressed elongate members 8 arranged in recesses 9 in the cylindrical surface of the piston 5. The elongate members 8 are arranged between the rings 6 to define an enclosed sealed area on the piston 5 cylindrical surface, and adjacent to the walls 4 of the cylinder 1 in contact with them.

A distance between the edges of the rings 6 external to the elongate members 8 is greater than a minimum height of the gas distribution ports, e.g. of the blowoff port 2.

Figure 5:
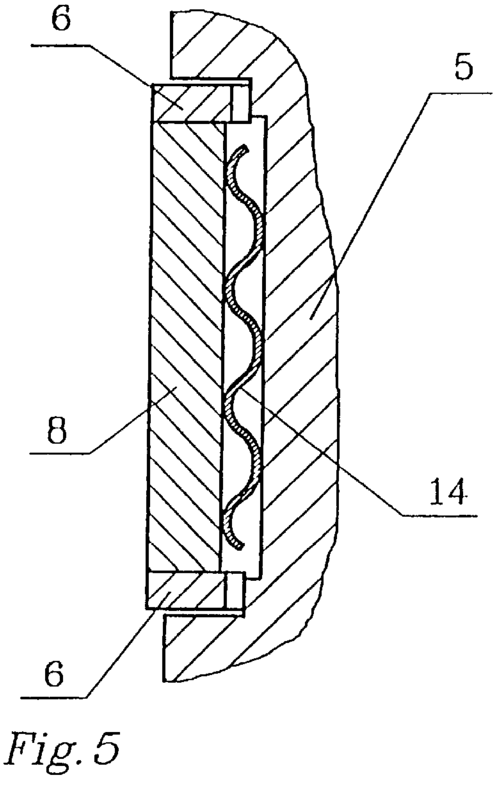
FIG. 5 illustrates an embodiment of the invention in accordance with claim 3.

A length of the recesses 9 can exceed a distance between the grooves 7. In this case, the ends of the elongate members 8 contact the end faces of the rings 6 (see FIG. 5).

Figure 7:
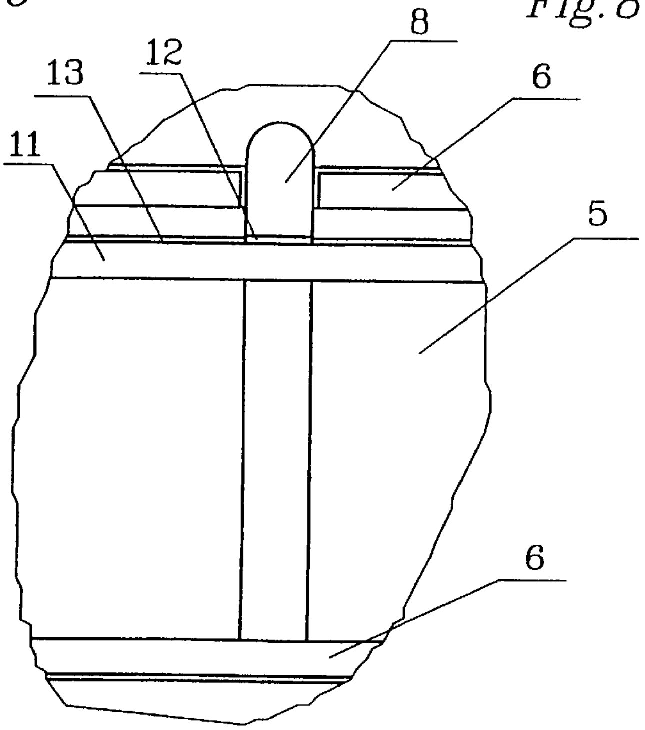
FIG. 7 illustrates an embodiment of the invention in accordance with claim 5.

The ends of the elongate members 8 can have shanks 10 disposed between the surface of the piston 5 and rings 6 in contact with their inner annular surfaces (see FIG. 7).

A length of the elongate members 8 can exceed a distance between the sealing rings 6, in this case one end of the elongate member 8 is disposed in the split of the ring 6 between its end faces, while the end of the other elongate member 8 may be disposed in the split of the second ring 6 (see FIG. 7).

Figure 8:
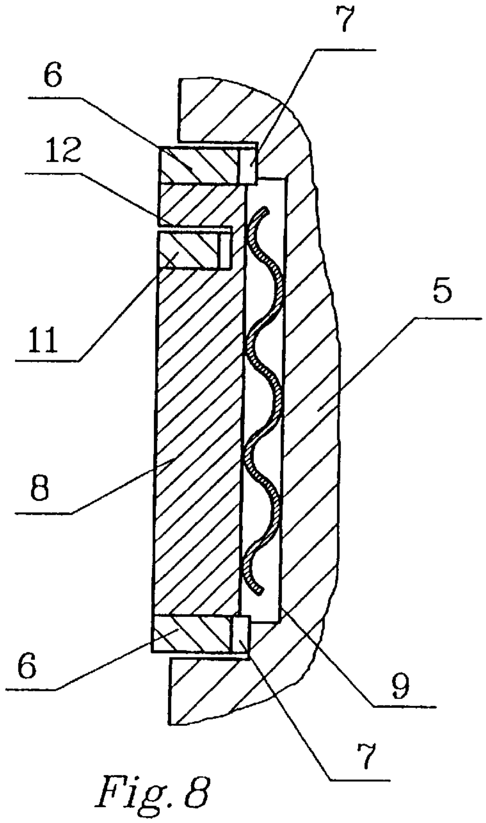
FIG. 8 illustrates an embodiment of the invention in accordance with claim 6.

The cylinder and piston assembly can have an additional ring 11, the elongate members 8 being provided with lateral grooves 12. In this case the ring 11 is arranged between the rings 6 in the groove 13 in the piston 5 and in grooves 12 in the elongate members 8 (see FIG. 8).

The elongate members 8 can be spring pressed by band expanders 14 arranged along them.

The assembly in accordance with the present invention operates in the following manner. The piston 5 of a two-stroke engine reciprocates within the cylinder 1 between the upper and lower dead points. When moving towards the lower dead point, the piston 5 first opens the discharge port 3 by its upper ring 6 and the upper edge. Combustion products under a sufficiently high pressure leak from the piston 1 to the atmosphere. Next, the blowoff port 2 opens and a fresh charge compressed either in a crank case or in an air pump (not shown) enters the cylinder 1, providing the blowoff and filling of the cylinder 1 cavity. Moving towards the upper dead point, the piston 5 first shuts the blowoff port 2 and next the discharge port 3, providing the compression of the fresh charge, followed by firing, combustion and expansion of the latter. In the case of absence of the elongate seals in the cylinder and piston assembly, the combustion products will flow, at the beginning of the discharge, through the annular gap around the piston 5 and arrive at the blowoff port 2, further leaking either to the crank chamber or to the air pump. There also exists the possibility of the reverse motion, e.g. the compressed fresh charge can flow from the blowoff port to the discharge port 3 around the piston 5 at the end of discharge when the gas pressure in the vicinity of the discharge port 3 falls off below the atmospheric pressure. In the engines with the crank case blowoff, gas can flow at the intake stroke from the discharge port 3 also around the piston 5 through the blowoff port 2 into the crank case.

The above phenomenon progresses as the cylinder diameter and, consequently, the expansion clearance increase, prohibiting the implementation of the two-stroke cycle with the slot blowoff at large-size engines of the traditional design.

This problem does not exist in the engines with the valve blowoff and the valve-and-slot blowoff, and also in the engines with the slot blowoff wherein ports are arranged in different lateral planes, e.g. with oppositely moving pistons.

In the traditional engines the problem can be solved by providing elongate sealing members 8 to prevent gas flow around the piston 5.

Figure 4:
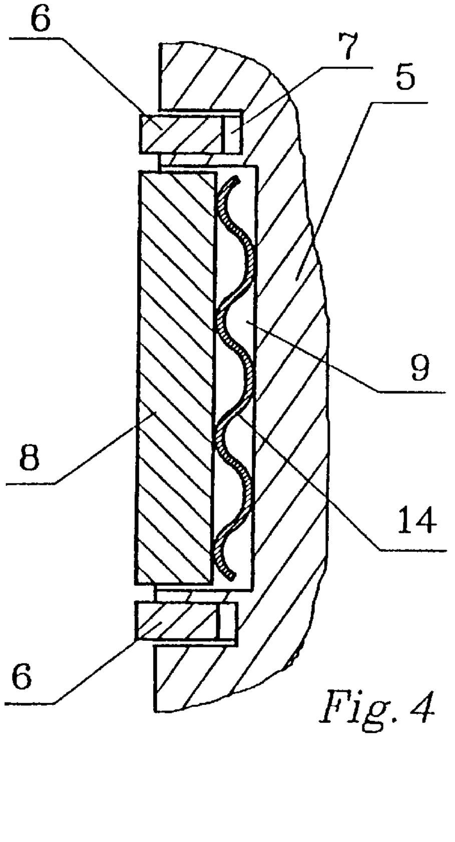
FIG. 4 is a sectional view taken through line B—B of FIG. 2.

In the simplest embodiments (see FIGS. 4 and 5), the elongate members 8 are arranged between rings 6 with a small gap and, therefore, define an enclosed sealed area on the piston 5 surface around each of the gas distribution ports within a small range of the piston 5 motion in the vicinity of the lower dead point. In this case, the greater is the elongate member length to port height ratio, the less is the gas leakage amount (in particular, in engines with an air pump).

Figure 6:
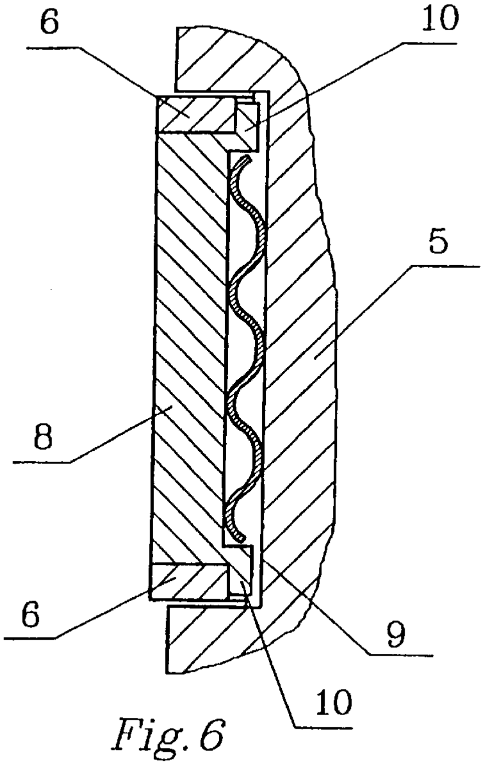
FIG. 6 illustrates an embodiment of the invention in accordance with claim 4.

In another embodiment (see FIG. 6), the shanks 10 of the elongate members 8, being spring pressed by the expanders 14, act as spreaders for the rings 6 which in this case can be made from an inelastic material, such as aluminum.

In the embodiment depicted in FIG. 7, an end of the elongate member 8 locks the ring 6 against rotation relative to the piston 5, the ring 6 split coinciding in plan with the wall 4 of the cylinder 1, which is the necessary condition for the two-stroke engine operation.

Additional rings 11, as may be required, e.g. in engines tuned for performance (see FIG. 8), are arranged in the lateral grooves 12 in the elongate members 8 and in the grooves 13 between the rings 6.

Industrial Applicability

The present invention can be employed in designing engines, in particular, in designing and manufacturing internal combustion engines, and ensures the advance to a new stage in designing two-stroke engines, especially, large-size ones, owing to the improved efficiency of the operation process accomplished in them.

What is claimed is:

1. A cylinder and piston assembly for an internal combustion engine, comprising a cylinder having gas distribution ports separated by walls, a piston arranged within the cylinder and provided with at least a pair of sealing rings located in grooves and at least a pair of spring pressed elongate members arranged in substantially vertical respective recesses in the piston cylindrical surface, wherein said spring pressed elongate members are arranged between the sealing rings to define an enclosed sealed area on the piston cylindrical surface, and adjacent to the walls of the cylinder in contact with them.

2. A cylinder and piston assembly as set forth in claim 1, wherein a distance between edges of the sealing rings external to the elongate members is greater than a minimum height of the gas distribution ports.

3. A cylinder and piston assembly as set forth in claim 2, wherein a length of the recesses for the elongate members exceeds a distance between the grooves, the elongate members being disposed so that the ends thereof contact end faces of the sealing rings.

4. A cylinder and piston assembly as set forth in claim 2, wherein the elongate members have shanks at their ends, the shanks being disposed between the piston surface and the sealing rings so that to contact inner annular surfaces of the sealing rings.

5. A cylinder and piston assembly as set forth in claim 2, wherein a length of the elongate members exceeds a distance between the sealing rings, at least one end of the elongate member being located in a split in the sealing ring between the end faces of the ring.

6. A cylinder and piston assembly as set forth in any of claims 1 to 5, comprising at least one additional ring, the elongate members having lateral grooves and the additional ring being arranged between the sealing rings in the groove in the piston and in the lateral grooves in the elongate members.

7. A cylinder and piston assembly as set forth in claim 6, wherein the elongate members are spring pressed by band expanders arranged along the elongate members.

* * * * *